April 22, 1930.　　　M. FRISCH　　　1,755,250
ROLLER JOURNAL
Filed Feb. 9, 1928　　　2 Sheets-Sheet 1
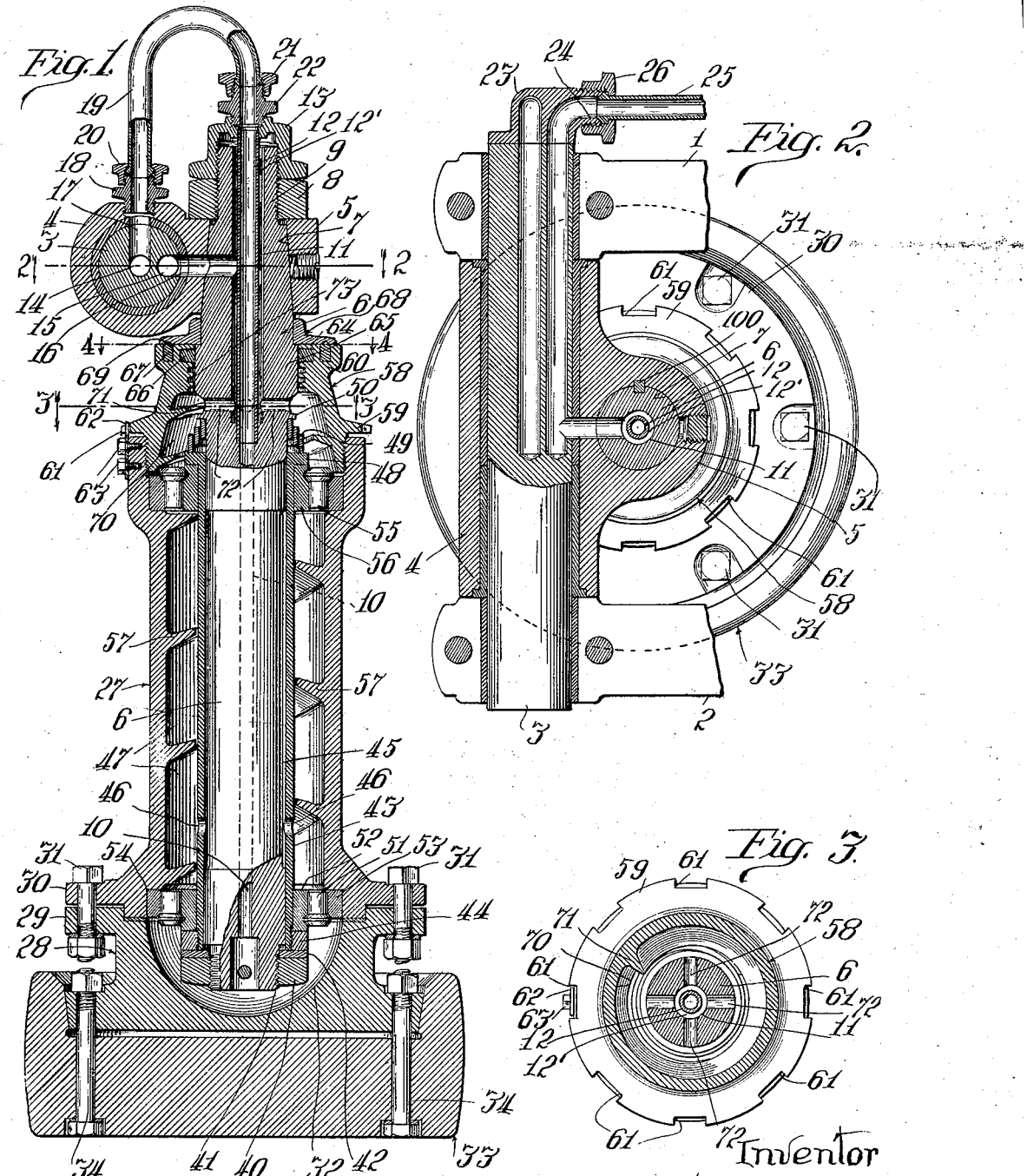
Inventor
Martin Frisch
By Barnett & Truman
Attorneys

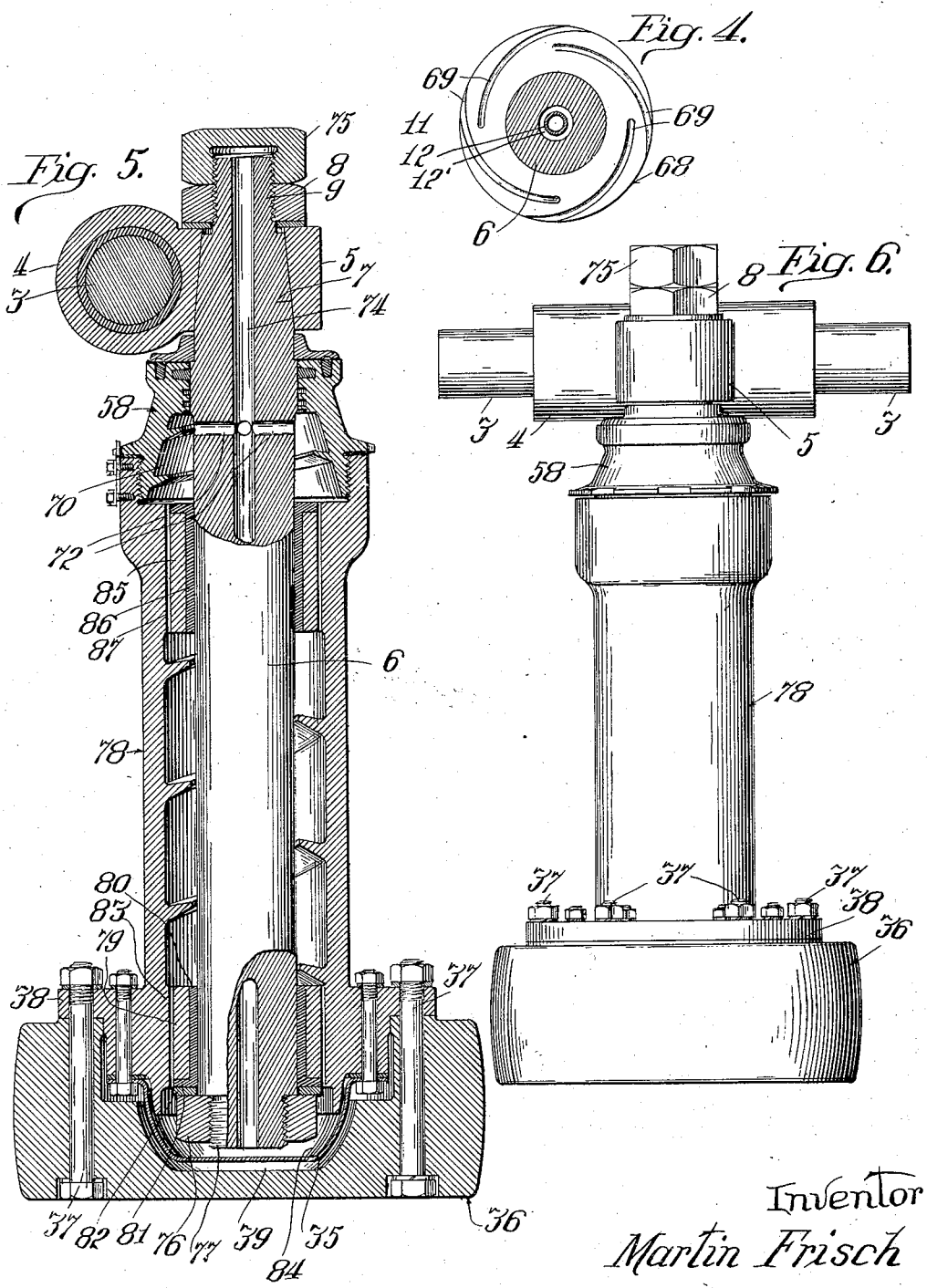

Patented Apr. 22, 1930

1,755,250

UNITED STATES PATENT OFFICE

MARTIN FRISCH, OF ST. LOUIS, MISSOURI, ASSIGNOR TO INTERNATIONAL COMBUSTION ENGINEERING CORPORATION, OF NEW YORK, N. Y., A CORPORATION OF DELAWARE

ROLLER JOURNAL

Application filed February 9, 1928. Serial No. 253,080.

This invention relates to improved means for rotatably supporting and lubricating the bearings of, a pulverizing roller for a grinding or pulverizing mill of the general type shown, for example, in the patent to Raymond et al., 1,573,191, granted February 16, 1926. In a mill of this type, a plurality of pulverizing rollers are pivotally suspended in a circular series from a rotating frame or spider, the rollers swinging out by centrifugal force against the inner surface of a fixed circular bull-ring, whereby the material caught between the ring and rollers is pulverized. The present invention relates to an improved form of journal support for one of these rollers, in combination with improved means for lubricating the bearings between the fixed supporting shaft and the rotatable assembly. Two forms of lubricating systems are shown, having many features in common, one being a self-contained lubricating system for each roller, and the other a forced-feed system whereby a continuous flow of lubricant is provided through the bearings. The forced-feed lubricating system is made the subject matter of a separate application, filed February 9, 1928, Serial No. 253,079, and is only claimed in this application in so far as the roller supporting means is modified to adapt it for use with this forced-feed system.

One object of the invention is to provide improved means for rotatably mounting and supporting a pulverizing roller from a non-rotatable shaft suspended in a substantially upright position.

Another object is to provide an improved journal support for a pulverizing roller in which roller bearings may be used.

Another object is to provide improved packing means for preventing the excessive escape of oil or other lubricant between the non-rotating supporting shaft and the rotating assembly.

Another object is to provide improved means for detachably supporting the roller from a rotating housing, so that the roller may be removed and replaced without disturbing the roller-supporting means.

Another object is to provide improved means for maintaining an upward flow of oil through the bearings by means of which the roller assembly is rotatably supported.

Another object is to provide improved means for permitting a continuous flow of oil or other lubricant through the bearings.

Other objects and advantages of this invention will be more apparent from the following detailed description of certain approved forms of apparatus involving the principles of the invention.

In the accompanying drawings:

Fig. 1 is a central vertical section through one approved form of the assembled apparatus.

Fig. 2 is an enlarged horizontal section taken substantially on the line 2—2 of Fig. 1.

Fig. 3 is a horizontal section taken substantially on the line 3—3 of Fig. 1.

Fig. 4 is a horizontal section taken substantially on the line 4—4 of Fig. 1.

Fig. 5 is a view similar to Fig. 1 showing another modification.

Fig. 6 is an elevation, on a somewhat smaller scale, of the roller assembly shown in Fig. 5.

At 1 and 2 are shown the arms of a yoke on the rotating spider of the roller mill. In these arms is mounted the trunnion shaft 3 on which is secured the rocker member 4 having a laterally projecting boss or bracket 5. The roller supporting shaft 6 has an upper conical end portion 7 which is drawn up tightly within the correspondingly shaped opening in boss 5 by means of the nut 8 screwed onto the reduced threaded end portion 9 of the shaft. A key 100 fitting mating grooves in the boss 5 and shaft 6 prevents relative rotation between these two members.

An oil supply passage 10 extends axially through shaft 6 from end to end thereof, the upper portion of this passage being enlarged as indicated at 11. A tube 12, of substantially the same bore as the lower portion of passage 10, extends through the enlarged portion 11 so as to divide the portion 11 into a continuation of the supply passage 10 and an outer annular return passage 12'. A cap 13, screwed onto the upper threaded end 9 of shaft 6, is engaged with the upper end of tube 12 so as to separate the supply and return passages at their upper ends. The trunnion 3 is bored out from one end to form an inlet passage 14 and an outlet passage 15. A passage or conduit 16 bored out of the shaft 6, rocker 4, and trunnion 3 connects the annular return passage 12' in the shaft with the outlet passage 15 in the trunnion. A lateral passage 17 extends from the inlet passage 14 through the top of the trunnion and rocker 4, and a screw plug 18 threaded into the top of rocker 4 forms a continuation of this passage. A tubular conduit 19 is connected with plug 18 by means of the cap nut 20 which engages over the enlarged head of tube 19. In an exactly similar manner, the other end of tubular conduit 19 is connected by means of cap 21 and plug 22 with the cap 13 on shaft 6, so that the conduit 19 will form a continuation of the tube 12 and supply passage 10 in the shaft 6. A fixture 23 secured to the end of trunnion shaft 3 is formed with two threaded nozzles 24 (only one of which is illustrated) whereby flexible conduits 25 may be connected with the respective inlet and outlet passages 14 and 15 by means of cap nuts 26. The connection to the inlet passage 14 is at right angles to the connection illustrated in Fig. 2, extending upwardly. By means of suitable apparatus, not here illustrated, but disclosed in my copending application Serial 253,079 hereinabove referred to, a continuous flow of oil is provided, in through passage 14 and out through passage 15.

A hollow sleeve or housing 27 surrounds the major portion of shaft 6 concentrically therewith but spaced therefrom as will be hereinafter apparent. A bottom closure member 28 extends around the lower end of shaft 6, and is removably secured to sleeve or housing 27, the two members being provided with outwardly projecting annular flanges 29 and 30 connected by bolts 31, in the example here shown. The closure member 28 is hollowed out at 32 to form a well for lubricant. The pulverizing roller 33 is clamped to and suspended from the closure member 28, by means of a series of bolts 34, in the form of the invention shown in Fig. 1. Alternatively, as shown in Fig. 5, the closure member may be in the form of a comparatively thin metal cap 35 secured to the lower end of the supporting sleeve, and the pulverizing rollers 36 may be bolted directly to the lower end of the sleeve by means of bolts 37 extending through the roller and an outwardly projecting flange 38 at the lower end of the sleeve. It will also be apparent that the cap 35 shown in Fig. 5 could be omitted entirely, and the cavity 39 in the roller 36 be utilized as the lubricant well.

Returning again to the form of the invention shown in Fig. 1, a nut 40 screwed onto the lower threaded end 41 of shaft 6, supports through washer 42, a sleeve or bushing 43 having an annular ring or nut 44 screwed onto its lower end. Sleeve 43 extends up practically the length of the housing 27 and slidably engages the outer surface of shaft 6 adjacent its upper and lower ends, the shaft 6 being slightly reduced between these points as indicated at 45. Oil passages 46 connect the enclosed annular space 45 with the annular oil space 47 between the housing 27 and bushing 43. The upper end of bushing or sleeve 43 is flanged outwardly at 48, and a spiral shock absorbing spring 49 is confined between flange 48 and a fixed annular flange 50 on shaft 6.

In this form of the invention a roller thrust bearing assembly of any suitable type, the example here shown being known as "Bower" roller bearings, supports the sleeve or housing 27 and parts carried thereby from the lower end of shaft 6. The annular series of rollers 51 are confined between an inner race ring 52 which surrounds sleeve 43 and is supported on nut 44, and an outer race ring 53 which fits within an annular recess 54 in the lower end of sleeve 27. A similar roller bearing assembly 55 is provided adjacent the upper end of sleeve 27, the inner race ring 56 being confined beneath the outstanding flange 48 at the upper end of sleeve or bushing 43.

A helical rib or flange 57 projects inwardly from the inner wall of sleeve 27 into rather close proximity to the sleeve 43, although it does not engage therewith. This flange 57 is curved in such a direction with relation to the direction of rotation of the rotating assembly, that it will tend to positively lift oil or other lubricant from the well 32 and carry same up through the annular space 47 between the rotating sleeve and the shaft. There is a natural tendency for this oil to travel upwardly, due to the rotation of the container, but the flange 57 forms a means for positively lifting the oil so as to expedite the continuous flow of oil through the rotating assembly.

A cap or closure member 58 is screwed into the upper end of housing 27, above the upper roller bearing 55. Cap 58 has an outstanding flange 59 which extends over the upper end 60 of sleeve 27, flange 59 being provided with a series of recesses 61, adapted to be selectively engaged by the upper end of a locking bar 62 secured to sleeve 27 by screw bolts 63. The elevation of cap 58 may be properly adjusted by screwing the cap into or out of the sleeve 27, and it is then locked in adjusted position by means of the locking bar 62. The upper end 64 of cap 58 extends into close proximity to an enlarged portion 65 of shaft 6, and houses and supports a pair of annular gaskets 66 and 67 which bear respectively against the shaft 6 and the lower plane face of a collar 68 secured to the shaft. These gaskets are adapted to seal the joint between the shaft and the rotating assembly, and prevent the excessive escape of oil. A very slight escape of oil is desirable in order to combat and prevent the entrance of dust through this joint. The lower face of collar 68 is also provided with a series of partially spiral grooves 69 (see Fig. 4) also tending to work against the escape of oil through this joint.

The walls of the cavity 70 in cap 58 are provided with a spiral rib or flange 71, similar to rib 57 in sleeve 27, for lifting oil through the space within cap 58, above the roller bearing 55. Adjacent the upper end of cavity 70, a plurality of radial passages 72 extend inwardly to the annular return passage 12'. The inner cylindrical surface of head 64 of cap 58, below the gasket 66, is formed with a helical groove 73 having an inclination opposite to the inclination of ribs 57 and 71, so as to tend to prevent the rise of oil from cavity 70 toward the sealing gaskets 66 and 67.

When in use, this roller will hang freely within the mill, and will be permitted to swing freely about the axis of trunnion 3 so that centrifugal force will tend to force the pulverizing roller against the bull-ring. As the supporting spider is rotated, the roller 33 will roll around on the inner surface of the bull ring, whereby the rotatable assembly comprising the roller 33, cap 28, sleeve or housing 27, cap 58, gaskets 66 and 67, and minor features carried by these elements will rotate about the fixed shaft 6. The sleeve or bushing 43 will not ordinarily move, but may be forced upwardly against the shock absorbing spring 49 to take up vertical thrusts, and can if necessary rotate about the shaft 6 in case of injury to the roller bearings, or other binding of parts.

Oil or other lubricant is forced in through inlet passage 14, passage 17, and tubular conduit 19, into the upper end of tube 12 and thence down through the supply passage 10 to the lower end of shaft 6 and into the well 32. The rapid rotation of the assembly will tend to throw this oil upwardly through the lower roller bearing and thence upwardly through passage 47 between the rotating sleeve 27 and the shaft. Some of this oil will pass in through openings 46 to the annular space 45 between the bushing 43 and shaft 6. The main volume of the lubricant will be carried upwardly by the helical rib or flange 57, and after passing through the upper roller bearing 55 will be carried up by rib 71 and pass out through radial passages 72 to the return passage 12', thence through passage 16 to the outlet passage 15 in the trunnion shaft 3. Some of this oil will tend to escape through the joint between cap 58 and the shaft 6 and collar 68, but this escape of oil is largely prohibited by the gaskets 66 and 67, and the oil-returning grooves 73 and 69.

If it becomes necessary to remove or replace the pulverizing roller 33, this may be done by merely removing the bolts 34 without disassembling the remainder of the rotating assembly.

In the modification shown in Figs. 5 and 6, a self-contained lubricating system is used instead of the forced feed system hereinabove described. Also, roller-bearings are not used in this modification. Many of the features of this form of the invention are substantially the same as those previously described and will not be again referred to in detail. In this modification, the oil passages in the trunnion 3 and rocker 5 will be omitted. A single supply conduit 74 extends axially throughout the length of the shaft 6. A supply of oil or other lubricant is inserted into passage 74 by removing the cap 75 from the upper end of the threaded portion 9 of the shaft. If desired, the upper portion of passage 74 may be enlarged to form a reservoir for storing lubricant, or a reservoir may be connected to the upper end of passage 74.

A thrust collar 76 is carried by the lower end of shaft 6, the collar here being shown in the form of a nut threaded onto the reduced end 77 of the shaft. The supporting sleeve or housing 78, which is generally of the same form as the housing 27 of Fig. 1, has an inner collar 79 at its lower end in which is mounted the bushing 80 having an outwardly flanged lower end 81, between which and the thrust collar 76 is interposed a thrust ring 82. A plurality of cored or drilled oil passages 83 extend up through collar portion 79, connecting the lower oil well 84 with the oil space 47 in housing 78. An inwardly extending collar 85 at the upper end of housing 78 supports a bushing 86 rotatably mounted about the upper portion of shaft 6. A plurality of oil passages 87, similar to the passages 83 in the lower collar, connect annular oil space 47 with the oil space 70 in the cap 58.

The oil is forced up from well 84, partly by the head of oil in passage 74, and partly by centrifugal force, some oil passing between bushing 80 and the shaft 6, and some passing through oil-passages 83. The oil in annular space 47 is elevated by the annular rib 57 as in the first form of the invention, this oil then passing between the upper bushing 86 and shaft 6, and through passages 87, to the oil space in cap 70, from which it is forced through radial passages 72 back into the reservoir or conduit 74, thus completing the cycle.

I claim:

1. In a device of the character described, a shaft, means in which the upper portion of the shaft is secured for suspending the shaft in a substantially upright position, the shaft having a lubricant passage extending substantially axially therethrough, a rotatable hollow sleeve adapted to surround a portion of the shaft coaxially therewith but spaced radially therefrom, a roller thrust bearing assembly comprising inner and outer race rings and a series of interposed rollers, means at the lower end of the shaft for supporting the inner race ring, the outer race ring supporting the sleeve, a similar roller bearing assembly mounted between the upper portions of the shaft and sleeve, a member secured to the lower end of the sleeve and enclosing the lower end of the shaft to form a well for lubricant, a pulverizing roller secured to and supported from the rotatable assembly, and packing means mounted between the upper end of the sleeve and the shaft.

2. In a device of the character described, a shaft, means in which the upper portion of the shaft is secured for suspending the shaft in a substantially upright position, the shaft having a lubricant passage extending substantially axially therethrough, a rotatable hollow sleeve adapted to surround a portion of the shaft coaxially therewith but spaced radially therefrom, a roller thrust bearing assembly comprising inner and outer race rings and a series of interposed rollers, means at the lower end of the shaft for supporting the inner race ring, the outer race ring supporting the sleeve, a similar roller bearing assembly mounted between the upper portions of the shaft and sleeve, a member secured to the lower end of the sleeve and enclosing the lower end of the shaft to form a well for lubricant, a pulverizing roller secured to and supported from the rotatable assembly, and packing means mounted between the upper end of the sleeve and the shaft and means within the sleeve and rotatable therewith for elevating lubricant from the well to the upper portion of the sleeve.

3. In a device of the character described, a shaft, means in which the upper portion of the shaft is secured for suspending the shaft in a substantially upright position, the shaft having a lubricant passage extending substantially axially therethrough, a rotatable hollow sleeve adapted to surround a portion of the shaft coaxially therewith but spaced radially therefrom, a roller thrust bearing assembly comprising inner and outer race rings and a series of interposed rollers, means at the lower end of the shaft for supporting the inner race ring, the outer race ring supporting the sleeve, a similar roller bearing assembly mounted between the upper portions of the shaft and sleeve, a member secured to the lower end of the sleeve and enclosing the lower end of the shaft to form a well for lubricant, a pulverizing roller secured to and supported from the rotatable assembly, packing means mounted between the upper end of the sleeve and the shaft and a spiral flange projecting inwardly from the sleeve toward the shaft for elevating lubricant.

4. In a device of the character described, a shaft, means in which the upper portion of the shaft is secured for suspending the shaft in a substantially upright position, the shaft having a lubricant passage extending substantially axially therethrough, a rotatable hollow sleeve adapted to surround a portion of the shaft coaxially therewith but spaced radially therefrom, a roller thrust bearing assembly comprising inner and outer race rings and a series of interposed rollers, means at the lower end of the shaft for supporting the inner race ring, the outer race ring supporting the sleeve, a similar roller bearing assembly mounted between the upper portions of the shaft and sleeve, a cylindrical bushing slidably enclosing the shaft and interposed between the inner race rings and the shaft, the bushing having an upper annular flange overlying the upper inner race ring, a shock absorbing spring interposed between the bushing flange and a projecting collar on the shaft, a member secured to the lower end of the sleeve and enclosing the lower end of the shaft to form a well for lubricant, a pulverizing roller secured to and supported from the rotatable assembly, and packing means mounted between the upper end of the sleeve and the shaft and means within the sleeve and rotatable therewith for elevating lubricant from the well to the upper portion of the sleeve.

5. In a device of the character described, a shaft, means in which the upper portion of the shaft is secured for suspending the shaft in a substantially upright position, a rotatable assembly including a housing and a pulverizing roller enclosing the lower portion of the shaft, bearings between the shaft and housing, means for lubricating the bearings, and sealing means between the upper end of the housing and the shaft comprising a collar on the shaft, there being a series of spiral grooves in the lower face of the collar, an annular cap on the housing projecting into proximity with the shaft and collar, and annular gaskets mounted in the cap and engaging the shaft and the lower face of the collar respectively.

6. In a device of the character described, a shaft, means in which the upper portion of the shaft is secured for suspending the shaft in a substantially upright position, a rotatable assembly including a housing and a pulverizing roller enclosing the lower portion of the shaft, bearings between the shaft and housing, means for lubricating the bearings, and sealing means between the upper end of the housing and the shaft comprising a collar on the shaft, an annular cap having a threaded engagement with the upper end of the housing, means for locking the cap in place, the free end of the cap projecting into proximity to the shaft and collar, and annular gaskets mounted in the cap and engaging the shaft and the lower face of the collar respectively.

7. In combination, a trunnion shaft, a yoke in which the trunnion is pivotally supported, a rocker secured on the trunnion shaft, a roller-supporting shaft the upper end of which is secured in the rocker so that the roller shaft is suspended in a substantially upright position, a pulverizing roller assembly rotatably mounted on and enclosing the lower portion of the shaft and supported thereby, bearings between the roller assembly and shaft, and means for supplying a continuous flow of lubricant to the bearings comprising a supply passage extending substantially axially through the roller shaft, a return passage in the upper portion of the roller shaft and communicating with the space in the rotatable assembly above the bearings, separate inlet and outlet passages in the trunnion shaft, and conduits connecting these passages with the supply and return passages respectively.

8. In combination, a trunnion shaft, a yoke in which the trunnion is pivotally supported, a rocker secured on the trunnion shaft, a roller-supporting shaft the upper end of which is secured in the rocker so that the roller shaft is suspended in a substantially upright position, a pulverizing roller assembly rotatably mounted on and enclosing the lower portion of the shaft and supported thereby, bearings between the roller assembly and shaft, and means for supplying a continuous flow of lubricant to the bearings comprising a supply passage extending substantially axially through the roller shaft, a return passage in the upper portion of the roller shaft and communicating with the space in the rotatable assembly above the bearings, separate inlet and outlet passages in the trunnion shaft, communicating passages formed in the rocker and shafts for connecting the return passages with the outlet passage, and a conduit connecting the upper end of the supply passage with the inlet passage.

9. In combination, a trunnion shaft, a yoke in which the trunnion is pivotally supported, a rocker secured on the trunnion shaft and projecting to one side thereof, a roller-supporting shaft the upper end of which is secured in the rocker so that the roller shaft is suspended in a substantially upright position, a pulverizing roller assembly rotatably mounted on and enclosing the lower portion of the shaft and supported thereby, bearings between the roller assembly and shaft, and means for supplying a continuous flow of lubricant to the bearings comprising a supply passage extending substantially axially through the roller shaft, an annular return passage surrounding the upper portion of the supply passage, a passage connecting the return passage with the space in the rotatable assembly above the bearings, separate inlet and outlet passages formed in the trunnion shaft and opening through one end thereof, means for conducting lubricant to and from these passages, a passage formed in the rocker and shaft for connecting the outlet passage with the annular return passage, and a conduit connecting the inlet passage with the upper end of the supply passage in the roller shaft.

10. In combination, a trunnion shaft, a yoke in which the trunnion is pivotally supported, a rocker secured on the trunnion shaft, a roller-supporting shaft the upper end of which is secured in the rocker so that the roller shaft is suspended in a substantially upright position, a pulverizing roller assembly rotatably mounted on and enclosing the lower portion of the shaft and supported thereby, bearings between the roller assembly and shaft, and means for supplying a continuous flow of lubricant to the bearings comprising a supply passage extending substantially axially through the roller shaft, a return passage in the upper portion of the roller shaft and communicating with the space in the rotatable assembly above the bearings, and conduits communicating with the supply and return passages in the shaft for conducting lubricant to and from a source of lubricant supply.

11. In combination, a trunnion shaft, a yoke in which the trunnion is pivotally supported, a rocker secured on the trunnion shaft, a roller-supporting shaft the upper end of which is secured in the rocker so that the roller shaft is suspended in a substantially upright position, a pulverizing roller assembly rotatably mounted on and enclosing the lower portion of the shaft and supported thereby, bearings between the roller assembly and shaft, and means for supplying a continuous flow of lubricant to the bearings comprising a supply passage extending substantially axially through the roller shaft, an annular return passage surrounding the upper portion of the supply passage, a passage connecting the return passage with the space in the rotatable assembly above the bearings and conduits communicating with the supply and return passages in the shaft for conducting lubricant to and from a source of lubricant supply.

12. In a device of the character described, a shaft, means in which the upper portion of the shaft is secured for suspending the shaft in a substantially upright position, the shaft having a lubricant passage extending substantially axially therethrough, a rotatable hollow sleeve adapted to surround a portion of the shaft coaxially therewith but spaced radially therefrom throughout the greater portion of its length, bearings interposed between the shaft and sleeve adjacent the upper and lower ends of the sleeve, a thrust collar carried by the lower end of the shaft and engaging beneath the lower bearing, a member secured to the lower end of the sleeve and enclosing the lower end of the shaft to form a lubricant well, a pulverizing roller secured to and supported from the rotatable assembly, packing means mounted at the upper end of the sleeve and engaging the shaft, and a spiral rib projecting inwardly from the sleeve toward the shaft for elevating lubricant.

13. In a device of the class described, a shaft, means in which the upper portion of the shaft is secured for suspending the shaft in a substantially upright position, a rotatable assembly comprising a housing and a pulverizing roller enclosing the lower portion of the shaft, bearings between the shaft and housing, means for lubricating the bearings, and sealing means between the upper end of the housing and the shaft comprising a collar on the shaft, there being a spiral groove in the lower face of the collar, an annular cap on the housing projecting into proximity with the shaft and collar, and annular gaskets mounted in the cap and engaging the shaft and the lower face of the collar respectively.

14. In a device of the class described, a shaft, means in which the upper portion of the shaft is secured for suspending the shaft in a substantially upright position, a rotatable assembly comprising a housing and a pulverizing roller enclosing the lower portion of the shaft but spaced radially therefrom to leave an annular space between the housing and shaft, bearings between the shaft and housing, sealing means between the upper portion of the housing and the shaft, and means for lubricating the bearings comprising a lubricant supply passage extending substantially axially through the shaft, an annular return passage surrounding the upper portion of the supply passage, a substantially radial passage connecting the annular return passage with the space between the housing and shaft beneath the sealing means, a lubricant well formed within the rotatable assembly, and means for elevating lubricant from the well through the bearings and annular space to the radial passage.

15. In a device of the class described, a shaft, means in which the upper portion of the shaft is secured for suspending the shaft in a substantially upright position, a rotatable assembly comprising a housing and a pulverizing roller enclosing the lower portion of the shaft but spaced radially therefrom to leave an annular space between the housing and shaft, bearings between the shaft and housing, sealing means between the upper portion of the housing and the shaft, and means for lubricating the bearings comprising a lubricant supply passage extending substantially axially through the shaft, an annular return passage surrounding the upper portion of the supply passage, a substantially radial passage connecting the annular return passage with the space between the housing and shaft beneath the sealing means, a lubricant well formed within the rotatable assembly, and means formed within the housing for assisting in elevating lubricant from the well through the bearings and annular space to the radial passage.

16. In a device of the class described, a shaft, means in which the upper portion of the shaft is secured for suspending the shaft in a substantially upright position, a rotatable assembly comprising a housing and a pulverizing roller enclosing the lower portion of the shaft but spaced radially therefrom to leave an annular space between the housing and shaft, bearings between the shaft and housing, sealing means between the upper portion of the housing and the shaft, and means for lubricating the bearings comprising a lubricant supply passage extending substantially axially through the shaft, an annular return passage surrounding the upper portion of the supply passage, a substantially radial passage connecting the annular return passage with the space between the housing and shaft beneath the sealing means, a lubricant well formed within the rotatable assembly, and a spiral flange projecting inwardly from the housing toward the shaft for elevating lubricant through the annular space to the radial return passage.

MARTIN FRISCH.